US009565740B2

(12) United States Patent
Ray

(10) Patent No.: US 9,565,740 B2
(45) Date of Patent: Feb. 7, 2017

(54) LIGHTING CONTROL MODULE

(71) Applicant: Corey D. Ray, Goldsboro, NC (US)

(72) Inventor: Corey D. Ray, Goldsboro, NC (US)

( * ) Notice: Subject to any disclaimer, the term of this patent is extended or adjusted under 35 U.S.C. 154(b) by 0 days.

(21) Appl. No.: 15/141,436

(22) Filed: Apr. 28, 2016

(65) Prior Publication Data

US 2016/0242260 A1 Aug. 18, 2016

Related U.S. Application Data

(63) Continuation-in-part of application No. 14/297,006, filed on Jun. 5, 2014, now Pat. No. 9,357,617.

(60) Provisional application No. 61/842,183, filed on Jul. 2, 2013.

(51) Int. Cl.
*H02J 9/02* (2006.01)
*H02J 9/06* (2006.01)
*H05B 37/02* (2006.01)

(52) U.S. Cl.
CPC ................................ *H05B 37/0209* (2013.01)

(58) Field of Classification Search
None
See application file for complete search history.

(56) References Cited

U.S. PATENT DOCUMENTS

2010/0024191 A1* 2/2010 Ledbetter ................. H02B 3/00 29/428
2010/0109438 A1* 5/2010 Scoggins, Jr. ............ H02J 9/02 307/66

* cited by examiner

*Primary Examiner* — Douglas W Owens
*Assistant Examiner* — Dedei K Hammond

(57) ABSTRACT

A lighting control module provides an enclosure for a circuit board, with the circuit board being mounted to and grounded to the enclosure. A primary power system is provided to receive and transmit voltage to lighting circuits, utilizing a terminal bus bar, a main switch, a voltage selection switch, and a transformer. An auxiliary power system draws energy from portable power sources in the event of a main power source failure. The auxiliary power system includes an associated terminal bus bar and an auxiliary switch. The primary and auxiliary power systems are connected to the lighting circuits through a circuit protection unit, e.g. fuse. The lighting circuits have both positive and negative terminals, LED indicators, switches, and individual fuses. The lighting circuits can be turned on and off individually by virtue of the switches for each lighting circuit. Status indicators and ground terminals are also provided.

18 Claims, 8 Drawing Sheets

LIGHTING CONTROL MODULE

The current application is a continuation in part of parent U.S. Non-Provisional patent application Ser. No. 14/297,006 filed on Jun. 05, 2014, which claims benefit of U.S. Provisional Patent application Ser. No. 61/842,183 filed on Jul. 02, 2013.

FIELD OF THE INVENTION

The present invention relates generally to a printed circuit board for a lighting system. The printed circuit board is safe, easy to operate, increases efficiency, and is housed within an enclosure such as a panel box.

BACKGROUND OF THE INVENTION

Fuse boxes are a common installation, seen in both commercial and residential sectors. These fuse boxes provide a convenient, single access, and overall safe apparatus that allows the common person to handle tripped fuses through a simple system of switches. Lighting systems, which are even more ubiquitous, are commonly installed as individual units. That is, each light is operated by its own switch, and is difficult to isolate electrically. There is a need for a centrally controlled lighting system which is easily and safely operated.

It is therefore an object of the present invention to provide a lighting circuit board and respective enclosure. It is a further object of the present invention to reduce lighting load by using a single alternating current (AC) power source to feed a subset of lighting system. Additionally, the present invention may be made compatible with solar panels by providing an appropriate connection, allowing for the adoption of renewable energy sources. The present invention provides auxiliary power in case of AC power failure, switches to turn off individual lighting circuits, switches to cut power (to allow for safe diagnosing and repairs of the circuit board), fuses for the various circuits, and a monitoring system that indicates active power feeds as well as faults or other conditions in the circuit board. The present invention can be used in both commercial and residential applications.

DETAIL DESCRIPTIONS OF THE INVENTION

All illustrations of the drawings are for the purpose of describing selected versions of the present invention and are not intended to limit the scope of the present invention.

Figure 1:
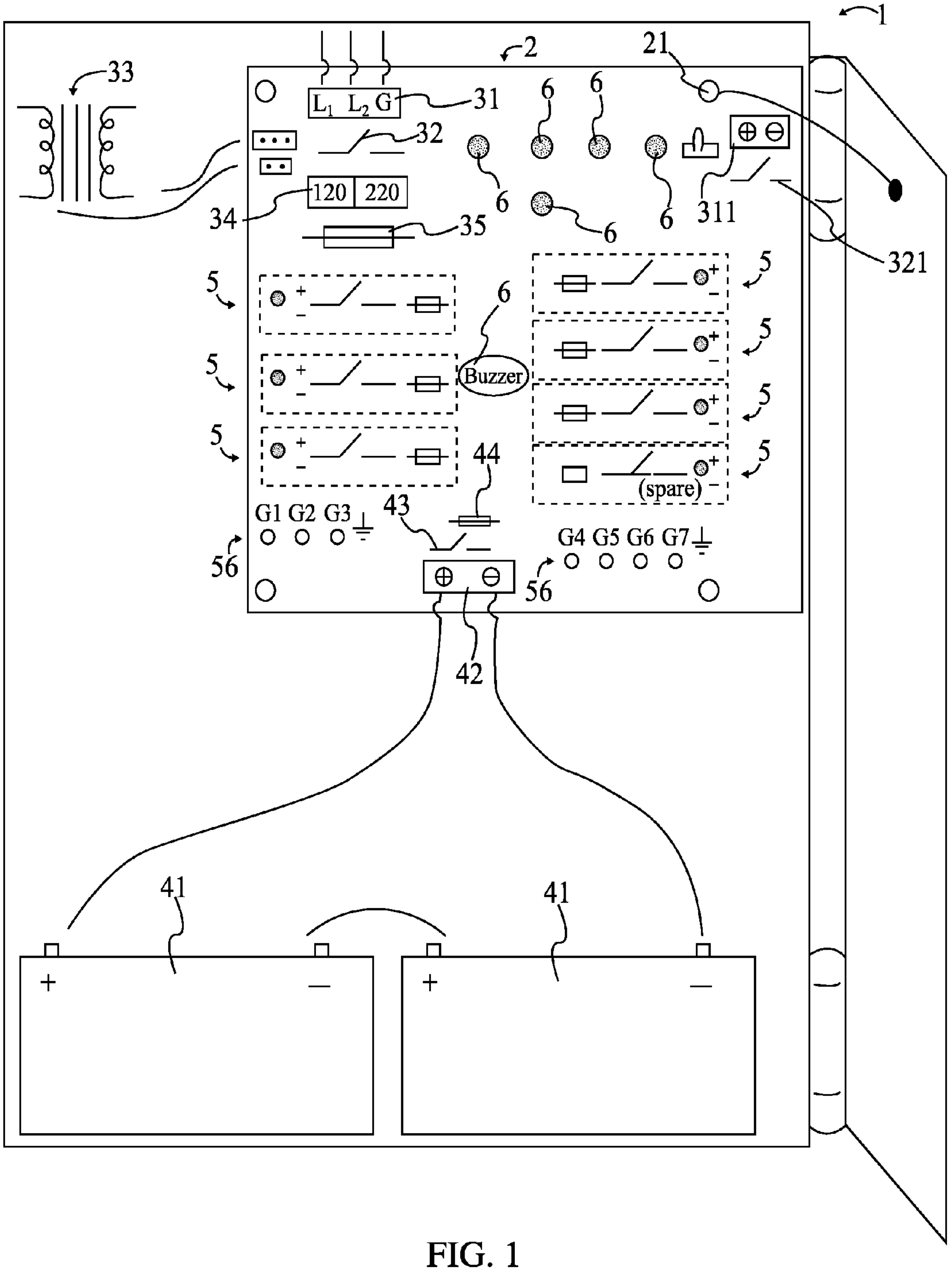
FIG. 1 is an illustration showing an enclosure and circuit board of the present invention.
Figure 2:
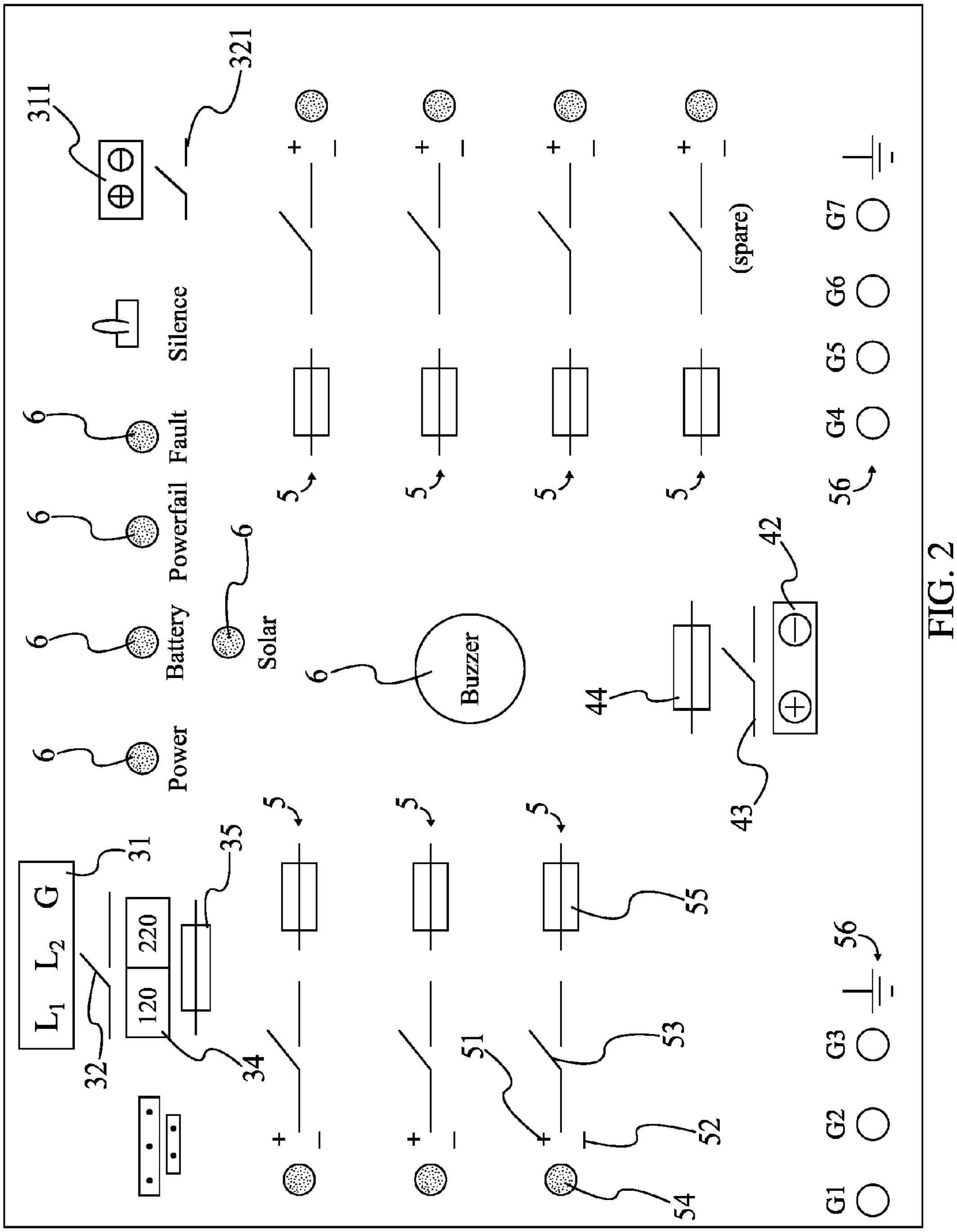
FIG. 2 is an illustration showing the circuit board of the present invention.

The present invention is a lighting control module that comprises an enclosure 1 and a circuit board 2. The present invention serves as a centralized control interface for a number of lights, providing a simple, safe, and power efficient apparatus that can be operated by the average person. The present invention draws from the basic concept of a distribution board, to which a number of improvements are introduced. The enclosure 1 acts as both a housing and electrical ground path for a number of components of the present invention while the circuit board 2 secures many of the electrical components of the present invention. The circuit board 2 is mounted to the enclosure as shown in FIG. 1, with the circuit board 2 being individually depicted in FIG. 2. In addition to the enclosure 1 and the circuit board 2, the present invention comprises a primary power system 3, an auxiliary power system 4, and a plurality of lighting circuits 5. The primary power system 3 is adapted to receive an electrical power feed and supply it to the plurality of lighting circuits 5. To this end, the primary power system 3 comprises a primary terminal bus bar 31, a main switch 32, and a transformer 33. Preferably, the primary power system 3 allows for additional sources of power, for example having a second electrical input that is connected to one or more solar panels. Thus, the primary power system 3 further comprises a secondary terminal bus bar 311 and a secondary switch 312. These additional components allow for further power sources, such as the aforementioned solar panels, to be utilized in conjunction with the present invention.

Figure 3:
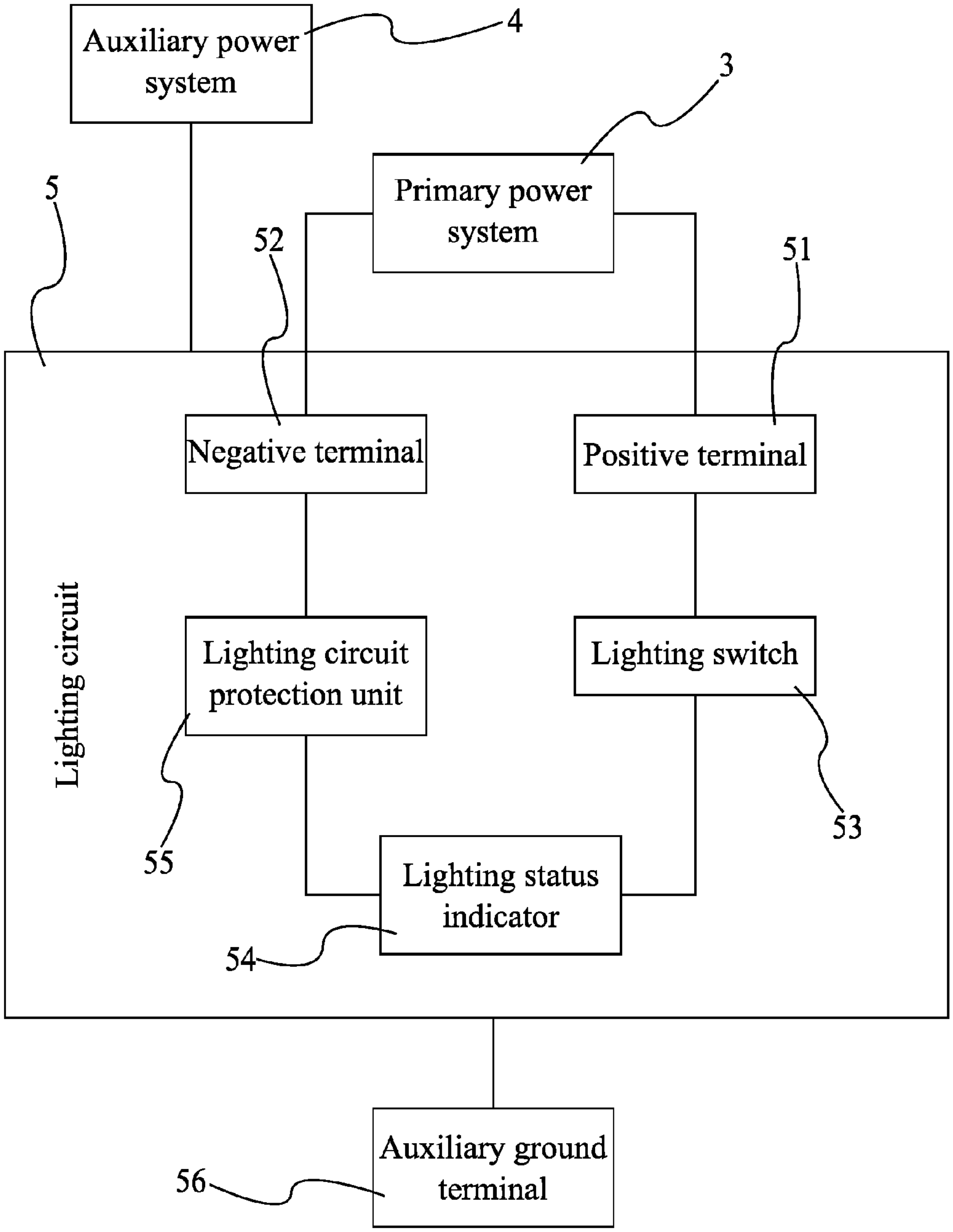
FIG. 3 is a block diagram depicting primary and secondary electrical connections of the present invention.
Figure 4:
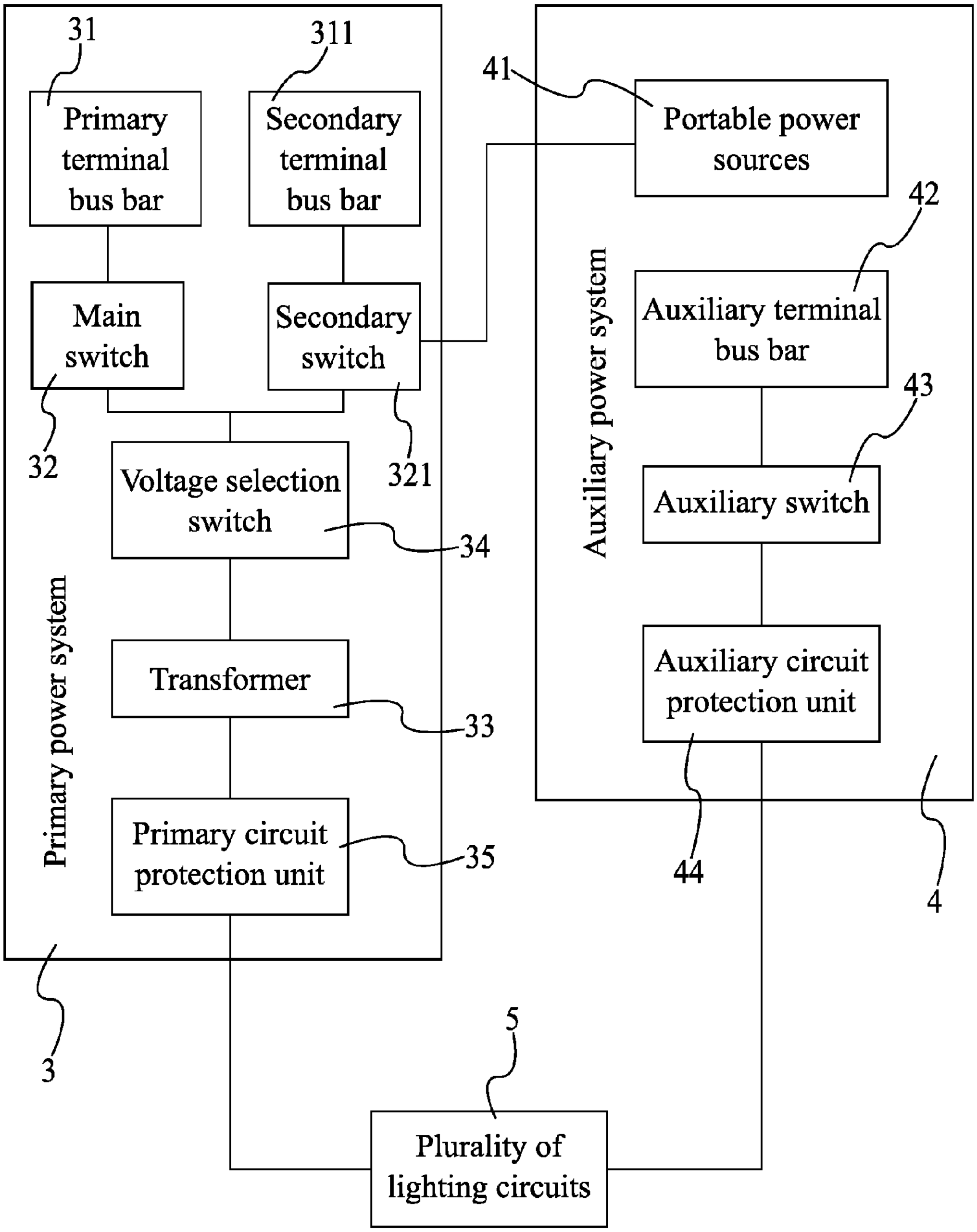
FIG. 4 is a block diagram depicting lighting circuit electrical connections of the present invention.
Figure 5:
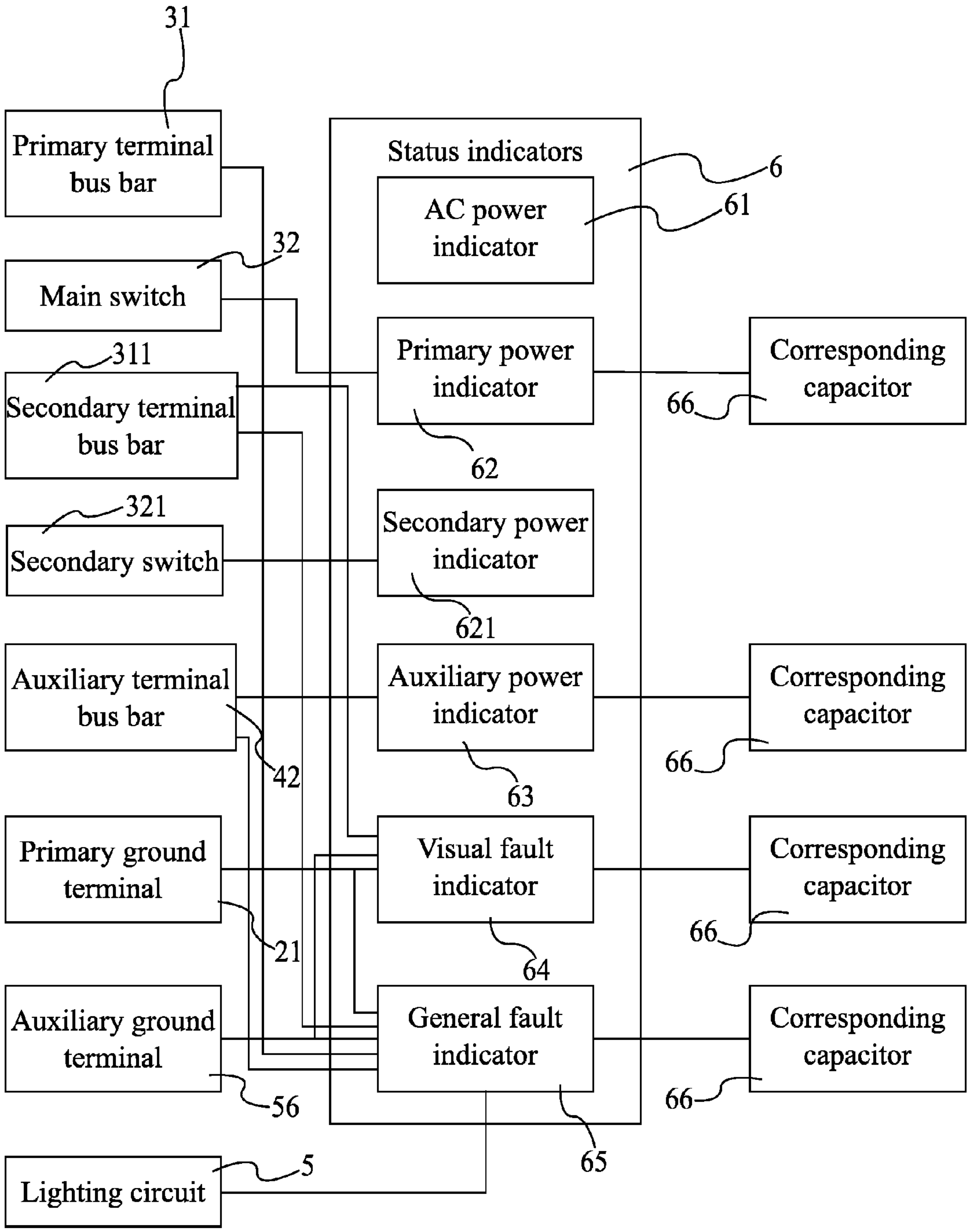
FIG. 5 is a block diagram depicting status indicator electrical connections of the present invention.

The auxiliary power system 4 provides backup power in the event the regular power feed is disrupted and thus comprises a plurality of portable power sources 41, an auxiliary terminal bus bar 42, and an auxiliary switch 43. Each of the plurality of lighting circuits 5 comprises a positive terminal 51, a negative terminal 52, a lighting switch 53, a lighting status indicator 54, and a lighting circuit protection unit 55. The circuit board 2, on which the plurality of lighting circuits 5 is installed, is itself mounted to the enclosure 1. Each of the plurality of lighting circuits 5 are electrically connected to the primary power system 3 and the auxiliary power system 4, allowing said lighting circuits 5 to be operated off of a primary energy supply or a backup energy supply as warranted. Electrical relations of the components of the present invention are depicted via block diagrams of FIG. 3, FIG. 4, and FIG. 5.

The primary power system 3 routes electricity from a power source to the plurality of lighting circuits 5. The primary terminal bus bar 31 serves as a connection point for external power source. The primary terminal bus bar 31 has specific receptacles for an alternating current (AC) hot, AC neutral, and ground wire connection. The primary terminal bus bar 31 is electrically connected to the main switch 32. The main switch 32 is provided to allow a user to turn off the incoming AC power; not only does this allow power to all of the lighting circuits 5 to be easily shut off, it makes safe maintenance simpler as only one switch (i.e. the main switch 32) must be manipulated to cut incoming power. The main switch 32 is electrically connected to a voltage selection switch 34, which provides compatibility with a larger number of markets. Similarly, the secondary switch 321 is also electrically connected to the voltage selection switch 34. Potentially, the secondary switch 321 may be provided with an individual voltage selection switch 34, or alternatively a single voltage selection switch 34 may be shared between the main switch 32 and the secondary switch 321. The voltage selection switch 34 allows a user to set the desired voltage level which is supplied to the plurality of lighting circuits 5, whether the voltage is originating from the main switch 32 or the secondary switch 321. In the preferred embodiment the voltage selection switch 34 can be set to 120 volts or 220 volts (at 30 amps and either 50 or 60 hertz); this allows the present invention to be used in a large number of countries, especially North America and Europe where said voltages are ubiquitous. The voltage selection switch 34 is electrically connected to the transformer 33, which is necessary to step-down voltage to a desirable level. The transformer 33 is electrically connected to the plurality of lighting circuits 5, providing each of them with power at an ideal voltage level. The preferred embodiment uses the transformer 33 to step down voltage levels to 24 volts of direct current. To prevent damage to the plurality of lighting circuits 5, a primary circuit protection unit 35 is preferably electrically integrated between the main switch 32 and the plurality of lighting circuits 5. Similarly, in embodiments with a secondary switch 321, the primary circuit protection unit 35 is electrically integrated between the secondary switch 321 and the plurality of lighting circuits 5. The primary circuit protection unit 35 may be shared between the main switch 32 and secondary switch 321, or alternatively each switch may be provided with a corresponding primary circuit protection unit 35. In this way, the relation between the primary circuit protection unit 35 and both the main switch 32 and secondary switch 321 is similar to the relation between the voltage selection switch 34 and both the main switch 32 and secondary switch 321. The primary circuit protection unit 35 reduces the risk of costly mishaps and accidents by breaking electrical connections if an overcurrent situation develops. In the preferred embodiment the primary circuit protection unit 35 is a fuse which is rated at 1.5 amps and 250 volts for 115 volt AC sources and is rated at 0.075 amps and 250 volts for 230 volt AC sources.

The secondary terminal bus bar 311 and the secondary switch 312, preferably supplying energy from a renewable source e.g. solar power, are ideally able to recharge the plurality of portable power sources 41. Thus, the plurality of portable power sources 41 is electrically connected to the secondary terminal bus bar 311 through the secondary switch 312. Resultantly, when the secondary switch 312 is "on" solar power can be used to easily and cost-effectively recharge the portable power sources 41. The secondary switch 312 itself allows a user to easily enable or disable solar power or other potential secondary power sources.

The majority of the primary power system 3 is directly installed on the circuit board 2, with the primary terminal bus bar 31, the main switch 32, the secondary terminal bus bar 311, the secondary switch 321, and the voltage selection switch 34 being mounted onto the circuit board 2. The transformer 33 is instead mounted within the enclosure 1, and is preferably positioned adjacent to the circuit board 2 to make it easier to complete the electrical connections between the transformer 33, the voltage selection switch 34, and the plurality of lighting circuits 5.

The plurality of portable power sources 41 is electrically connected to the auxiliary terminal bus bar 42, analogous to how an external power source is electrically connected to the primary terminal bus bar 31. The auxiliary terminal bus bar 42 has a bus bar positive terminal and a bus bar negative terminal to which the plurality of portable power sources is connected. The auxiliary terminal bus bar 42 is electrically connected to the plurality of lighting circuits 5 through the auxiliary switch 43. The auxiliary switch 43 allows auxiliary power to be easily enabled or disabled, similar to the capabilities of the main switch 32 of the primary power system 3. The auxiliary power system 4 also comprises an auxiliary circuit protection unit 44, which is electrically connected between the auxiliary switch 43 and the plurality of lighting circuits 5 in order to provide overcurrent protection. In the preferred embodiment the portable power sources 41 are a pair of 12 volt batteries connected in series, supplying a total of 24 volts as required by the plurality of lighting circuits 5.

Describing the relation between the primary power system 3 and the plurality of lighting circuits 5 in more detail, the primary power system 3 is electrically connected to the positive terminal 51 and the negative terminal 52 of each individual lighting circuit. The positive terminal 51 and the negative terminal 52, which serve as connection points for the lighting circuit, are electrically connected to each other through the lighting switch 53 and the lighting circuit protection unit 55. Furthermore, the lighting status indicator 54 is electrically connected between the primary power system 3 and the lighting switch 53. The lighting status indicator 54 is also electrically connected between the auxiliary power system 4 and the lighting switch 53. These components provide a number of capabilities to the present invention. The lighting switch 53 allows individual lighting circuits 5 to be turned on and off; this makes maintenance easier as only circuits that require work need to be turned off. This is in comparison to some prior art where control over individual circuits is not provided, requiring the entire system to be turned off before maintenance can begin. The lighting circuit protection unit 55 is functionally equivalent to the primary circuit protection unit 35, serving to prevent overcurrent situations in a respective lighting circuit. The lighting status indicator 54 is preferably an illumination source that activates when power is flowing through the lighting circuit, and is dark otherwise. The lighting status indicator 54 serves as a easy to notice visual indicator of whether a given lighting circuit 5 is active or not; if the lighting status indicator 54 is lit up then the lighting circuit 5 is active, whereas if the lighting status indicator 54 is unlit then the lighting circuit 5 is off.

A plurality of auxiliary ground terminals 56 is mounted to the circuit board 2 in order to provide ground paths for the plurality of lighting circuits 5. Each of the plurality of auxiliary ground terminals 56 has a corresponding circuit, with one of the plurality of auxiliary ground terminals 56 being electrically connected to a corresponding circuit from the plurality of lighting circuits 5. A separate primary ground terminal 21 is also provided; this primary ground terminal 21 is mounted to the circuit board 2 and electrically connected to the enclosure 1. The auxiliary ground terminals 56 and the primary ground terminal 21 are safety-enhancing components that provide a ground path for the other electrical components of the present invention.

As described thus far the present invention allows power to be supplied to and controlled for individual lighting circuits 5. The auxiliary power system 4 allows the lighting circuits 5 to continue to operate in the event of a main power failure. The lighting switch 53 of each of the lighting circuits 5 allows for maintenance to be performed on an individual circuit without having to cut power to all lighting circuits 5. To quickly inform a person of the active conditions of the present invention, a plurality of status indicators 6 are provided along with the heretofore described components.

The plurality of status indicators 6 comprises an AC power indicator 61, a primary power indicator 62, a auxiliary power indicator 63, a visual fault indicator 64, and a general fault indicator 65. In the embodiment with a secondary (e.g. solar) power source, the plurality of status indicators 6 further comprises a secondary power indicator 621. These status indicators let a person know whether there is an active external power source, whether the primary power system 3 (including the solar power source where applicable) is on or off, if the auxiliary power system 4 is on or off, and if any electrical faults have been detected in the circuitry. In the preferred embodiment illumination sources are implemented as the AC power indicator 61, the primary power indicator 62, the auxiliary power indicator 63, and the visual fault indicator 64. The general fault indicator 65, meanwhile, is preferably a noise-generating buzzer. The general fault indicator 65 is electrically connected to the primary ground terminal 21, the plurality of auxiliary ground terminals 56, the primary terminal bus bar 31, the secondary terminal bus bar 311, the auxiliary terminal bus bar 42, and the plurality of lighting circuits 5. During normal operation of the present invention most of the status indicators will be inert; a status indicator only activates (whether creating light or noise) if another component experiences a failure, is turned off, or if there is a fault. The power for the status indicators is provided through a corresponding capacitor 66, with each status indicator having its own corresponding capacitor 66. The corresponding capacitor 66 is charged during normal operation of the present invention, with the accumulated charge being used to power the status indicators when other components are turned off or otherwise disrupted. The exception to this is the AC power indicator 61, which is lit during normal operating and becomes unlit if no AC power is detected and does not have a corresponding capacitor 66.

The AC power indicator 61 is electrically connected to the primary terminal bus bar 31. During normal operation of the present invention the AC power indicator 61 is illuminated; If no incoming AC power is detected then the AC power indicator 61 turns off. In the preferred embodiment the AC power indicator 61 is colored green. Thus, if a user see a green light they instantly know that the AC power is active and functioning normally.

Likewise, the AC power indicator 61 is electrically connected to the secondary terminal bus bar 311. When the secondary switch 321 is in an "on" position (i.e. solar power is being supplied), the AC power indicator 61 engages, displaying a green light to show users that AC power is active and functioning normally. When the secondary switch 321 is in an "off" position (for example to allow maintenance to be performed), the AC power indicator 61 likewise turns off, i.e. it does not light up (with a green color). This provides a visual indication that no AC power is being supplied to the present invention.

The primary power indicator 62 is electrically connected to the main switch 32. The corresponding capacitor 66 is electrically connected between the primary power indicator 62 and the main switch 32. The corresponding capacitor 66 is charged during normal operation of the present invention, during which the primary power indicator 62 is unlit. If the main switch 32 is set to an "off" setting, then the corresponding capacitor 66 provides power to illuminate the primary power indicator 62. In the preferred embodiment the primary power indicator 62 is colored green. Thus, a user seeing a red light instantly knows that the primary power system 3 is switched off. Once the primary power system 3 is switched back on the primary power indicator 62 becomes unlit, indicating that primary power is active.

The secondary power indicator 621, which turns on to show secondary power is active, does not require a corresponding capacitor 66. Because the secondary power indicator 621 turns off when power is not present, it does not need a reserve power source. It only turns on when power is active, which means a power source will always be available. Regardless, if desired, a corresponding capacitor 66 could still be provided to help keep the secondary power indicator 621 on even in the event of a power failure; this could help a user more quickly diagnose where an issue is, especially alongside the other indicators of the present invention. In the preferred embodiment, the secondary power indicator 621 is colored yellow, though other colors are of course possible for the secondary power indicator 621.

The auxiliary power indicator 63 is electrically connected to the auxiliary terminal bus bar 42, with the corresponding capacitor 66 being electrically connected between the auxiliary power indicator 63 and the auxiliary terminal bus bar 42. The corresponding capacitor 66 is charged during regular operation of the present invention, with stored charge being used to power the auxiliary power indicator 63 when the auxiliary power system 4 has been disconnected, e.g. one of the portable power sources 41 is removed or the auxiliary switch 43 is set to an "off" setting. In the preferred embodiment the auxiliary power system 4 is off during normal operation. When the auxiliary power system 4 has been disconnected, the auxiliary power indicator 63 blinks with a yellow color. When the auxiliary power system 4 is reconnected, e.g. the auxiliary switch 43 is set to an "on" setting, the auxiliary power indicator 63 ceases blinking and turns off.

In an embodiment with a solar source of secondary power, the auxiliary power indicator 63 illuminates when the auxiliary power system 4 is engaged at the same time the secondary switch 312 is on; in other words, when both the batteries and the solar power are operating simultaneously. This occurs, for example, during night or when overcast conditions result in insufficient solar power being available, necessitating the need for utilizing the auxiliary power system 4. Once sufficient solar power is available the auxiliary power indicator 63 turns off as the secondary terminal bus bar 311 resumes serving as the primary power source. This allows for reduced energy costs while simultaneously negating a drawbacks (inconsistent power input) of solar energy.

Figure 6:
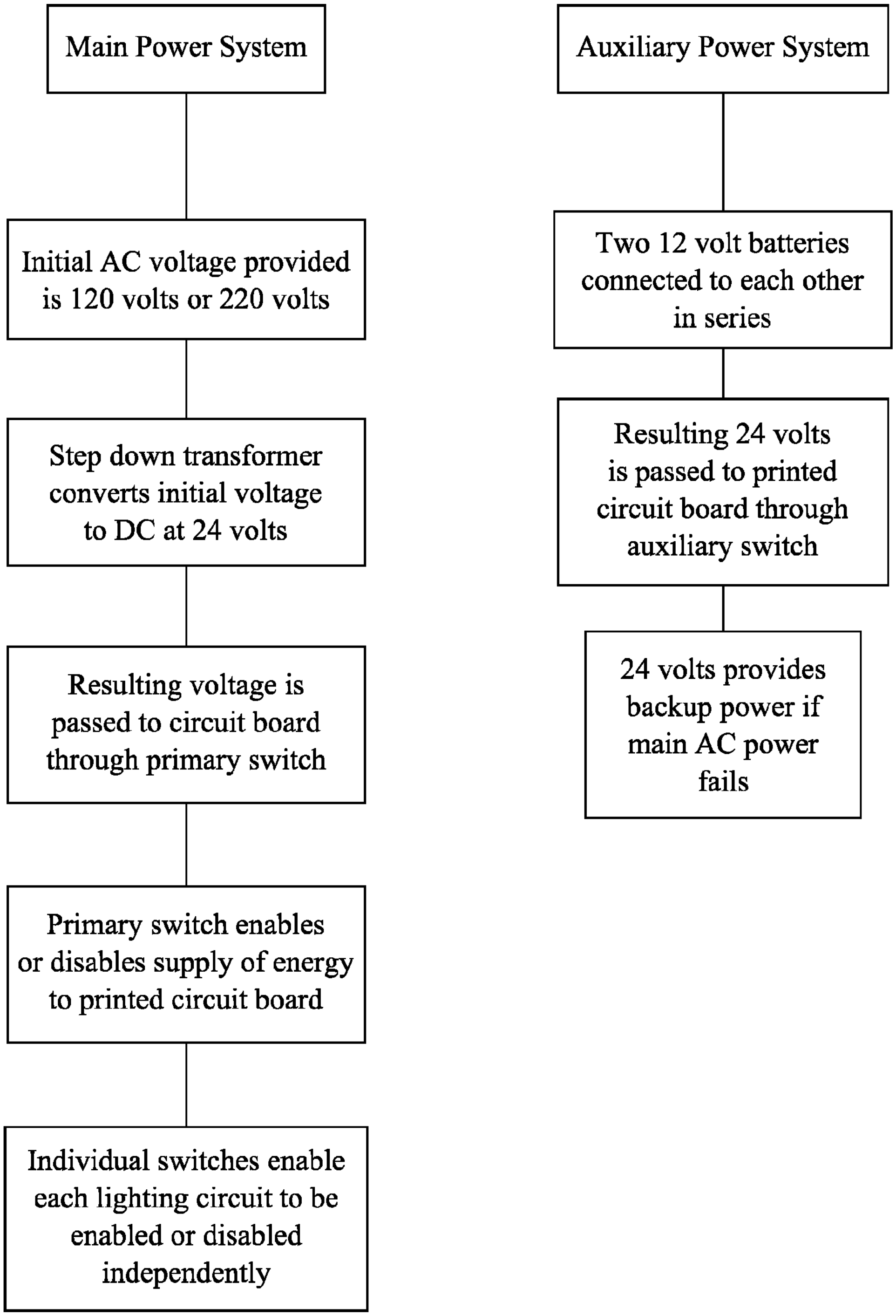
FIG. 6 is an outline of basic operation of the present invention.
Figure 7:
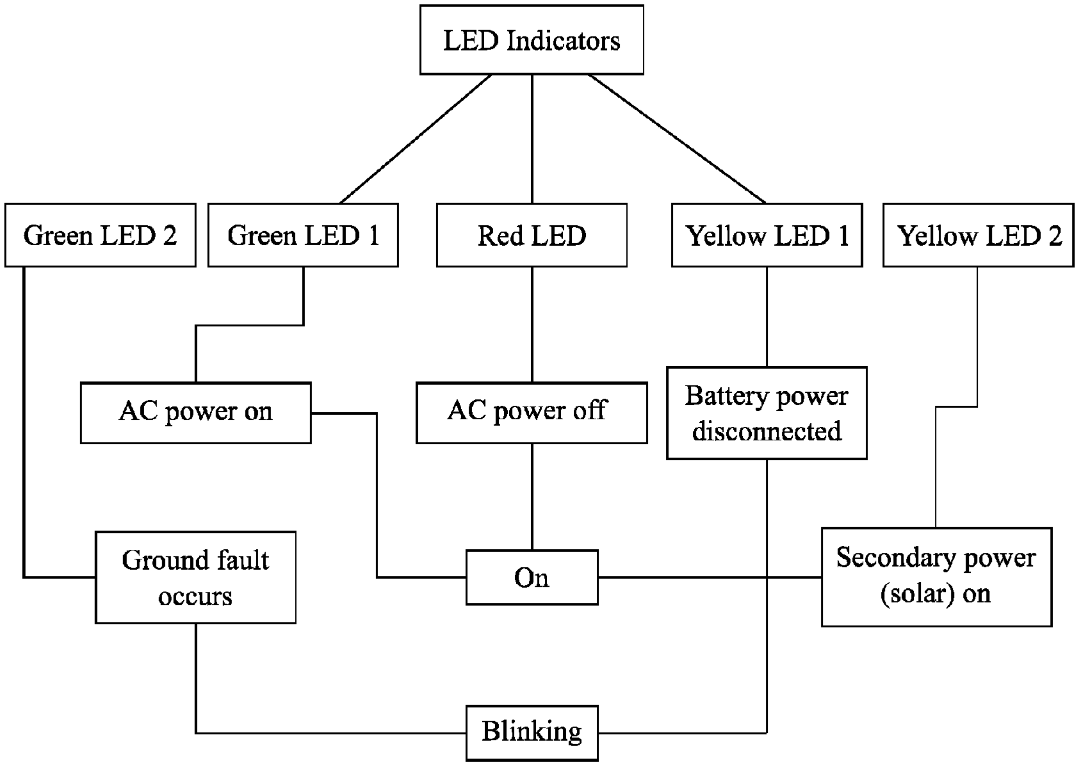
FIG. 7 is an outline of triggers associated with visual indicators of the present invention.
Figure 8:
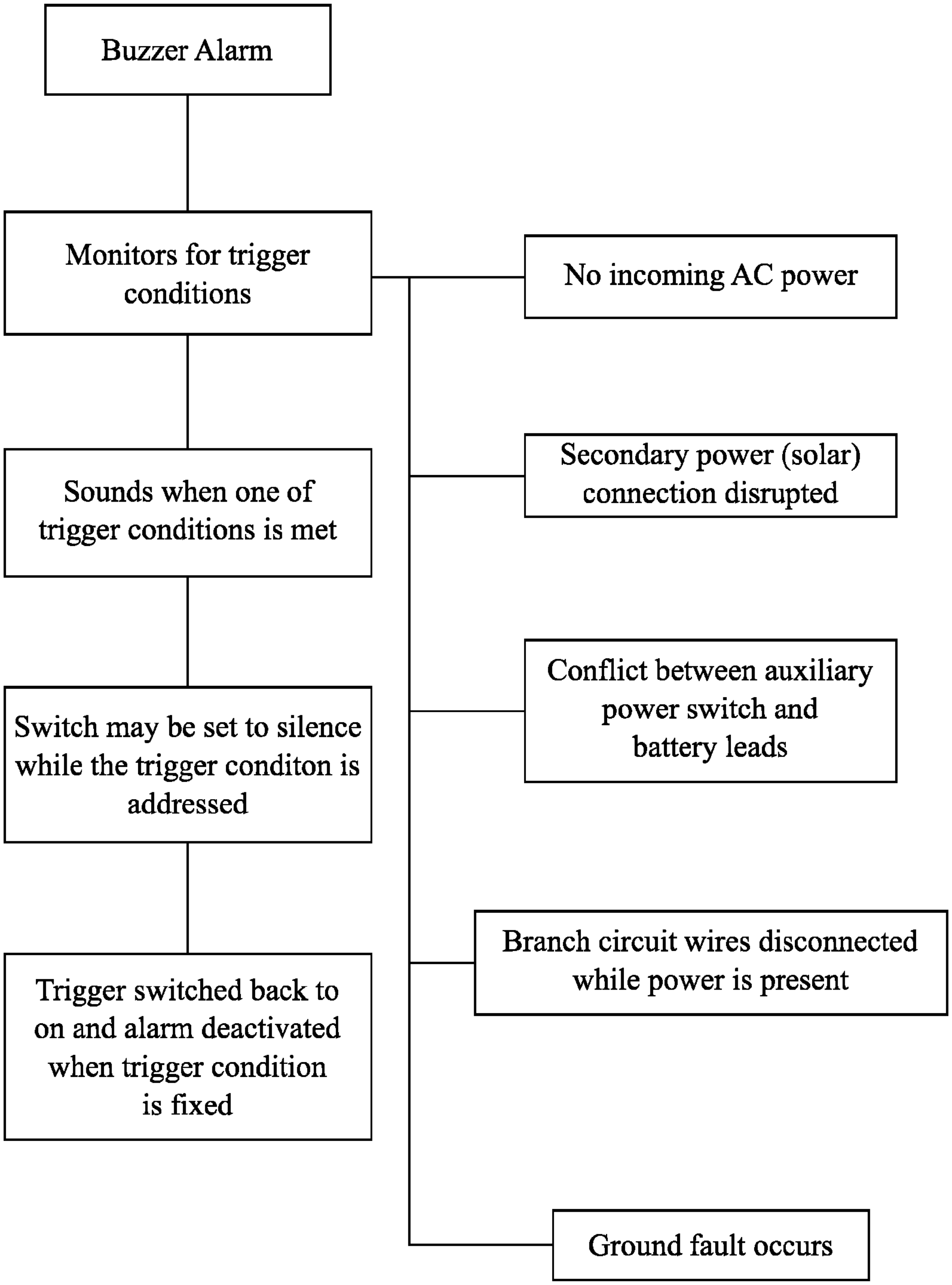
FIG. 8 is an outline of triggers associated with an audible indicator of the present invention.

The visual fault indicator 64 is electrically connected to the primary ground terminal 21 and the plurality of auxiliary ground terminals 56 while the general fault indicator 65 is additionally electrically connected to the primary terminal bus bar 31, the auxiliary terminal bus bar 42, and the plurality of lighting circuits 5. A corresponding capacitor 66 for each fault indicator is electrically connected between each bus bar (both the primary terminal bus bar 31 and the secondary terminal bus bar 311) and the respective fault indicator. The visual fault indicator 64 is provided for the detection of ground faults, and in the preferred embodiment begins blinking with a green color when a ground fault is detected. Potentially, the visual fault indicator 64 may also be triggered when the secondary switch 321 is in an "on" position but secondary (solar) power is lost. Once the ground fault is cleared, the visual fault indicator 64 ceases blinking and turns off. The general fault indicator 65 is provided to detect a system fault and is triggered upon a number of conditions. These conditions are as follows:

- an absence of incoming power (whether originating from the primary terminal bus bar 31 or the secondary terminal bus bar 311)
- the auxiliary switch 43 is set to an "on" setting but the corresponding battery leads are disconnected
- the auxiliary switch 43 is set to an "off" setting
- the corresponding battery leads are disconnected
- if the auxiliary switch 43 is set to an "off" setting but the corresponding battery leads are connected one of the plurality of lighting circuits 5 is disconnected while the primary power system 3 or the auxiliary power system 4 is active if a ground fault has occurred The general fault indicator 65 becomes deactivated provided all on/off switches are in the "on" position, and if no ground faults are detected. In the preferred embodiment the visual fault indicator 64 is a green colored illumination source that blinks when active. The general fault indicator 65, unlike the other indicators 6, is aural in nature. In the preferred embodiment the general fault indicator 65 is specifically a buzzer that sounds when triggered and is silenced when inactive. A silencing switch may also be provided to temporarily deactivate the general fault indicator 65 so that it does not distract a person attempting to address the root cause of the fault. The visual fault indicator 64 and general fault indicator 65 serve as additional safety instruments that quickly inform a person of potentially dangerous situations. The general operation and triggers of the present invention and its status indicators 6 are illustrated in FIG. 6, FIG. 7, and FIG. 8.

While the present invention has been described with many preferred components, different embodiments may be developed within the scope of the present invention. As an example, while the preferred embodiment utilizes fuses as the primary circuit protection unit 35 and the lighting circuit protection unit 55, in other embodiments circuit breakers could instead be used. Likewise, the specific voltages, currents, and numerical tolerances and ratings for the electrical components may be altered without impacting the functionality of the present invention. The number of lighting circuits 5 can be increased or decreased as compared to the preferred embodiment which has seven, including a spare.

Although the invention has been explained in relation to its preferred embodiment, it is to be understood that many other possible modifications and variations can be made without departing from the spirit and scope of the invention as hereinafter claimed.

What is claimed is:

1. A lighting control module comprises:

an enclosure;

a circuit board;

a primary power system;

an auxiliary power system;

a plurality of lighting circuits;

the primary power system comprises a primary terminal bus bar, a main switch, a secondary terminal bus bar, a secondary switch, and a transformer;

the auxiliary power system comprises a plurality of portable power sources, an auxiliary terminal bus bar, and an auxiliary switch;

each of the plurality of lighting circuits comprises a positive terminal, a negative terminal, and a lighting switch;

the circuit board being mounted to the enclosure;

the primary power system being electrically connected to each of the plurality of lighting circuits; and the auxiliary power system being electrically connected to each of the plurality of lighting circuits.

2. The lighting control module as claimed in claim 1 comprises:

a voltage selection switch;

the voltage selection switch being electrically connected to the transformer; and the transformer being electrically connected to the plurality of lighting circuits.

3. The lighting control module as claimed in claim 2 comprises:

a primary circuit protection unit;

the primary terminal bus bar being electrically connected to the main switch;

the main switch being electrically connected to the voltage selection switch; and the primary circuit protection unit being electrically connected between the main switch and the plurality of lighting circuits.

4. The lighting control module as claimed in claim 2 comprises:

a primary circuit protection unit;

the secondary terminal bus bar being electrically connected to the secondary switch;

the secondary switch being electrically connected to the voltage selection switch;

the plurality of portable power sources being electrically connected to the secondary terminal bus bar through the secondary switch; and the primary circuit protection unit being electrically connected between the secondary switch and the plurality of lighting circuits.

5. The lighting control module as claimed in claim 2 comprises:

the primary terminal bus bar, the main switch, the secondary terminal bus bar, the secondary switch, and the voltage selection switch being mounted onto the circuit board; and the transformer being mounted within the enclosure.

6. The lighting control module as claimed in claim 1 comprises:

an auxiliary circuit protection unit;

the auxiliary circuit protection unit being electrically connected between the auxiliary switch and the plurality of lighting circuits;

the plurality of portable power sources being electrically connected to the auxiliary terminal bus bar; and the auxiliary terminal bus bar being electrically connected to the plurality of lighting circuits through the auxiliary switch.

7. The lighting control module as claimed in claim 5 comprises:

the plurality of portable power sources being attached to the enclosure; and the auxiliary terminal bus bar and the auxiliary switch being mounted onto the circuit board.

8. The lighting control module as claimed in claim 1 comprises:

each of the plurality of lighting circuits further comprises a lighting status indicator and a lighting circuit protection unit;

the primary power system being electrically connected to the positive terminal and the negative terminal;

the positive terminal being electrically connected to the negative terminal through the lighting switch and the lighting circuit protection unit;

the lighting status indicator being electrically connected between the primary power system and the lighting switch; and the lighting circuit protection unit being electrically connected between the primary power source and the lighting switch.

9. The lighting control module as claimed in claim 8 comprises:

a plurality of auxiliary ground terminals;

the plurality of auxiliary ground terminals being mounted to the circuit board; and one of the plurality of auxiliary ground terminals being electrically connected to a corresponding circuit from the plurality of lighting circuits.

10. The lighting control module as claimed in claim 1 comprises:

a plurality of status indicators;

the plurality of status indicators comprises an AC power indicator, a primary power indicator, a secondary power indicator, an auxiliary power indicator, a visual fault indicator, and an general fault indicator;

the AC power indicator being electrically connected to the primary terminal bus bar and to the secondary panel bus bar;

the secondary power indicator being electrically connected to the secondary switch;

the primary power indicator being electrically connected to the main switch;

the auxiliary power indicator being electrically connected to the auxiliary terminal bus bar;

the visual fault indicator being electrically connected to a primary ground terminal and the plurality of auxiliary ground terminals; and the general fault indicator being electrically connected to the primary ground terminal, the plurality of auxiliary ground terminals, the primary terminal bus bar, the secondary terminal bus bar, the auxiliary terminal bus bar, and the plurality of lighting circuits.

11. The lighting control module as claimed in claim 10 comprises:

a corresponding capacitor being electrically connected between the primary power indicator and the main switch.

12. The lighting control module as claimed in claim 10 comprises:

a corresponding capacitor being electrically connected between the auxiliary power indicator and the auxiliary terminal bus bar.

13. The lighting control module as claimed in claim 10 comprises:

a corresponding capacitor being electrically connected between the visual fault indicator and the primary terminal bus bar.

14. The lighting control module as claimed in claim 10 comprises:

a corresponding capacitor being electrically connected between the visual fault indicator and the secondary terminal bus bar.

15. The lighting control module as claimed in claim 10 comprises:

a corresponding capacitor being electrically connected between the general fault indicator and the primary terminal bus bar.

16. The lighting control module as claimed in claim 10 comprises:

a corresponding capacitor being electrically connected between the general fault indicator and the secondary terminal bus bar.

17. The lighting control module as claimed in claim 10 comprises:

the AC power indicator, the primary power indicator, the secondary power indicator, the auxiliary power indicator, and the visual fault indicator each being an illumination source; and the general fault indicator being a noise-generating buzzer.

18. The lighting control module as claimed in claim 1 comprises:

a primary ground terminal; and the primary ground terminal being electrically connected to the enclosure.

* * * * *